United States Patent
Brown et al.

(10) Patent No.: US 7,196,806 B2
(45) Date of Patent: Mar. 27, 2007

(54) DATA PROCESSING SYSTEM FOR CONVERTING CONTENT RELATIVE TO A SPACE USED AS AN ADVERTISING MEDIUM INTO A PRINTABLE OBJECT

(75) Inventors: Michael Wayne Brown, Georgetown, TX (US); Michael Richard Cooper, Austin, TX (US); Mark Joseph Hamzy, Round Rock, TX (US); Mark Wayne VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 09/895,222

(22) Filed: Jun. 29, 2001

(65) Prior Publication Data

US 2003/0002070 A1    Jan. 2, 2003

(51) Int. Cl.
*G09G 5/00* (2006.01)
(52) U.S. Cl. .................. 358/1.15; 358/1.18; 345/157; 345/163
(58) Field of Classification Search .............. 358/1.15, 358/1.18; 707/517, 523; 715/517, 523; 345/157, 163
See application file for complete search history.

(56) References Cited

U.S. PATENT DOCUMENTS

| | | | | |
|---|---|---|---|---|
| 5,678,002 A | * | 10/1997 | Fawcett et al. | 715/709 |
| 5,956,487 A | * | 9/1999 | Venkatraman et al. | 709/218 |
| 5,991,514 A | * | 11/1999 | Nielsen | 358/1.14 |
| 6,029,182 A | * | 2/2000 | Nehab et al. | 715/523 |
| 6,061,700 A | * | 5/2000 | Brobst et al. | 715/517 |
| 6,118,449 A | * | 9/2000 | Rosen et al. | 715/861 |
| 6,442,529 B1 | * | 8/2002 | Krishan et al. | 705/14 |
| 6,766,362 B1 | * | 7/2004 | Miyasaka et al. | 709/219 |
| 6,865,719 B1 | * | 3/2005 | Nicholas, III | 715/856 |

* cited by examiner

*Primary Examiner*—Kimberly Williams
*Assistant Examiner*—Peter K Huntsinger
(74) *Attorney, Agent, or Firm*—Duke W. Yee; Marilyn Smith Dawkins; Wayne P. Bailey (57) ABSTRACT

A method, system and computer program product in a data processing system for printing a disjoint web object and content of a web page is provided. Responsive to presenting the web page by the browser, an embedded tag is presented as the disjoint web object. The disjoint web object is then printed based on the embedded tag, wherein content relative to the disjoint web object is printed along with content of the web page.

31 Claims, 6 Drawing Sheets

FIG. 10

DATA PROCESSING SYSTEM FOR CONVERTING CONTENT RELATIVE TO A SPACE USED AS AN ADVERTISING MEDIUM INTO A PRINTABLE OBJECT

BACKGROUND OF THE INVENTION

1. Technical Field

The present invention relates generally to an improved data processing system and in particular to a method and apparatus for printing a web object associated with a web page.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML).

In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some businesses offer goods and services solely on the Web while others use the Web to extend their reach. Many of these businesses will advertise or display their logos or trademarks on Websites.

However, once the Website is closed down, the logo or trademark disappears. Once the logo or trademark disappears, the effectiveness of the logo or trademark is lost and is reinforced only by the user accessing the same Website a second time. With the large quantity of Websites available to a user, the chances of the user seeing this specific logo or trademark a second time is minimal. If the user desires to go back to the same Website a second time, then there exists a probability that the user is already familiar with the business sponsoring the Website and the logo or trademark may not be effective in educating the user about the business associated with the logo or trademark.

Many users print a web page via a browser, however, advertising elements also associated with the web page are not printed. For example, a web page may contain advertising elements such as an advertising cursor or advertisements brought up in separate frames or windows. Therefore, it would be advantageous to have a mechanism to print these advertising elements when printing a web page which has spawned the advertising elements.

SUMMARY OF THE INVENTION

The present invention provides a method, system and computer program product in a data processing system for printing a disjoint web object and content of a web page. Responsive to presenting the web page by the browser, an embedded tag is presented as the disjoint web object. The disjoint web object is then printed based on the embedded tag, wherein content relative to the disjoint web object is printed along with content of the web page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
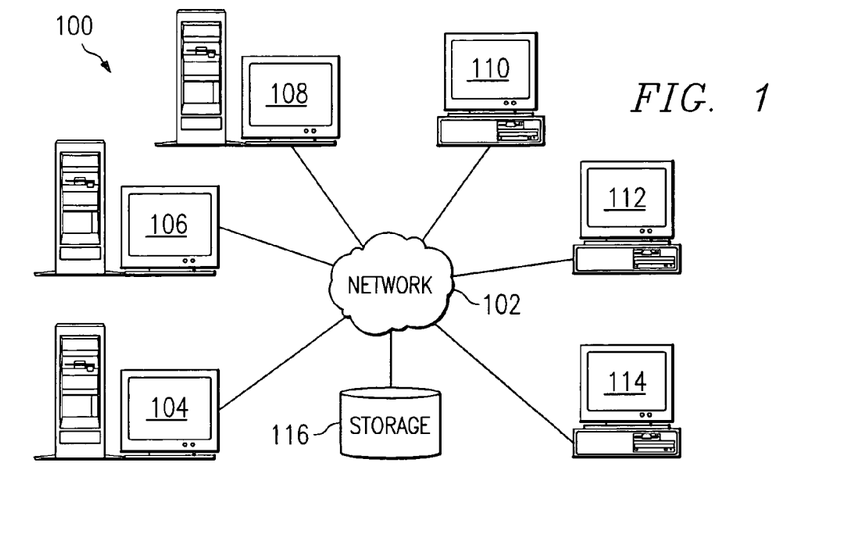
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 106, and 108 are connected to network 102 along with storage unit 116. In addition, clients 110, 112 and 114 also are connected to network 102. These clients 110, 112, and 114 may be, for example, personal computers or network computers. In the depicted example, servers 104, 106, and 108 provide data, such as boot files, operating system images, and applications to clients 110, 112, and 114. Clients 110, 112, and 114 are clients to servers 104, 106, and 108. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
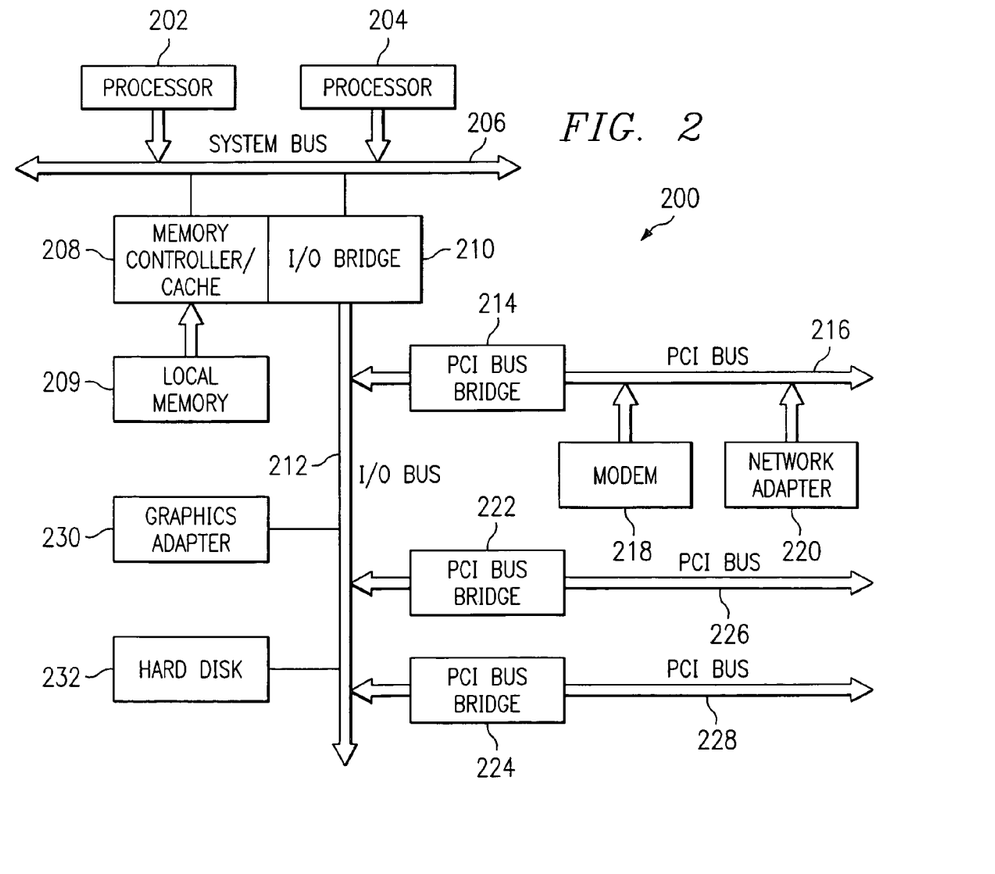
FIG. 2 is a block diagram depicting a data processing system that may be implemented as a server in which the present invention may be implemented.

FIG. 2 is a block diagram depicting a data processing system that may be implemented as a server in which the present invention may be implemented. FIG. 2, may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to computers 110, 112 and 114 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
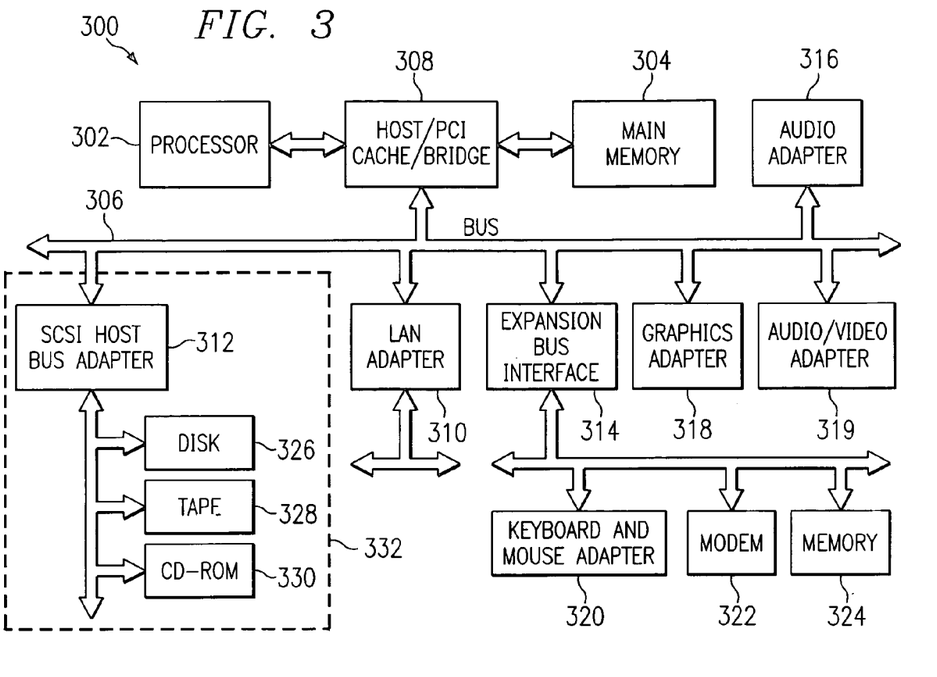
FIG. 3 is a block diagram illustrating a data processing system in which the present invention may be implemented.

FIG. 3 is a block diagram illustrating a data processing system in which the present invention may be implemented. Data processing system 300 is an example of a client computer, such as, for example, client computers 110, 112 and 114 in FIG. 1. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. he operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer program product for printing a display of a disjoint web object or cursor in a data processing system. An embedded tag may be presented as the disjoint web object. A disjoint web object may not be directly associated with content on a web page itself. The disjoint web object may be, for example, a pointer, content in a web frame, and content in a web window. The pointer, web frame and web window may not be included in the web page. A mechanism is used to print the disjoint web object or disjoint web objects when changed to a particular image associated with an organization for marketing purposes. For example, the typical disjoint web object may be changed to a disjoint web object for a company, such as International Business Machines. The logo of the company may be used in place of the normal disjoint web object. The disjoint web object may be displayed to a user through a document, such as a Web page in which instructions are imbedded in the document to change the disjoint web object from the standard disjoint web object to one specified by the mechanism. The disjoint web object may be changed to that for a specific graphical object. This graphical object may be a set of graphical images. Additionally, the graphical object may provide for a disjoint web object. When the Web page is printed, content of the Web page along with content of the disjoint web object is printed. In the depicted examples, the mechanism adds a "format for print" button to the Web page. Alternatively, a web browser may allow for notification of a print request to print the content of the disjoint web object.

Figure 4:
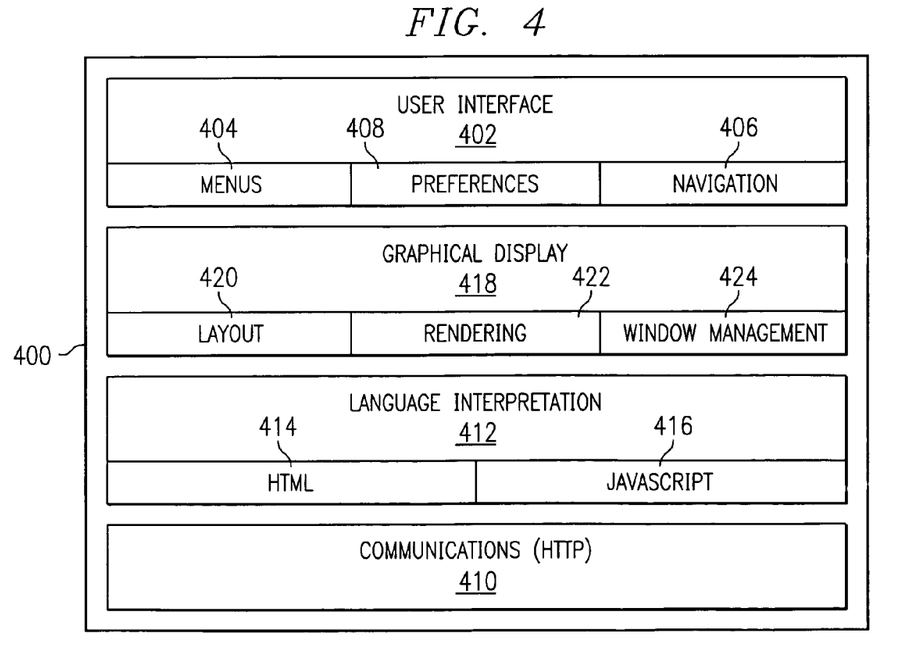
FIG. 4 depicts a block diagram of a browser program in accordance with a preferred embodiment of the present invention.

FIG. 4 depicts a block diagram of a browser program in accordance with a preferred embodiment of the present invention. A browser may be any application that is used to search for and display content on a distributed data processing system. Browser 400 may be located on a client, such as, for example, client 300 in FIG. 3. Browser 400 includes a user interface 402, which is a graphical user interface (GUI) that allows the user to interface or communicate with browser 400. This interface provides for selection of various functions through menus 404 and allows for navigation through navigation 406. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. Documents that are received by browser 400 are processed by language interpretation 412, which includes an HTML unit 414 and a JavaScript unit 416. Language interpretation 412 will process a document for presentation on graphical display 418. In particular, HTML statements are processed by HTML unit 414 for presentation while JavaScript statements are processed by JavaScript unit 416. In the depicted examples, the graphical object used to display an image in place of the pointer is manipulated by JavaScript statements embedded in the web page.

Graphical display 418 includes layout unit 420, rendering unit 422, and window management 424. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. Browser 400 may be implemented using currently available browsers, such as Netscape Navigator or Microsoft Internet Explorer. Netscape Navigator is available from Netscape Communications Corporation while Microsoft Internet Explorer is available by Microsoft Corporation.

Figure 5:
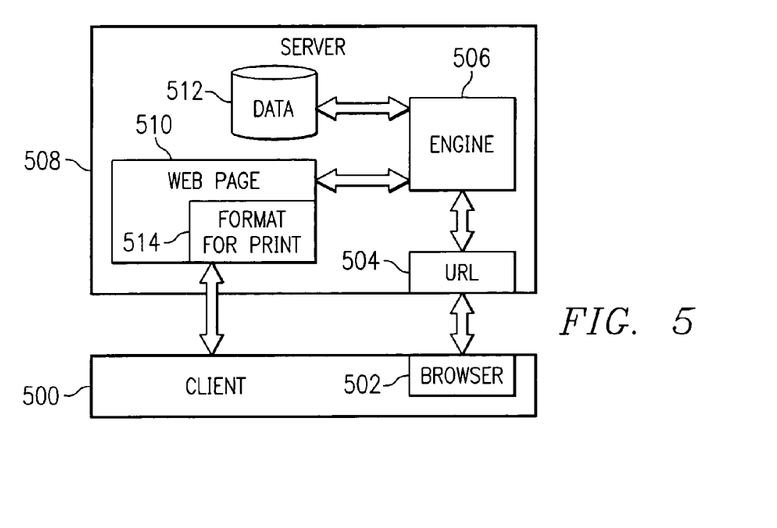
FIG. 5 depicts a diagram illustrating the mechanism used to change the disjoint web object in a data processing system in accordance with a preferred embodiment of the present invention.

FIG. 5 depicts a diagram illustrating the mechanism used to change the disjoint web object in a data processing system in accordance with a preferred embodiment of the present invention. In the following examples, even though a pointer is described, any disjoint web object may be used, which may include, for example, content in a web frame and content in a web window. In this example, client 500 through browser 502 sends a request to web server 508 via uniform resource locator (URL) 504 for a HTML document in the form of a Web page. Browser 502 may be implemented with a browser, such as browser 400 in FIG. 4. This request is processed by engine 506. Specifically, engine 506 retrieves Web page 510 or data used to dynamically generate a Web page from database 512, corresponding to the request received from client 500.

This Web page, such as Web page 510, is returned to client 500. Within Web page 510 is embedded the graphical object and instructions needed to change the appearance of the pointer on client 500. In this example, the graphical object is embedded using URL 504, which points to the location of the graphical object. Alternatively, the graphical object may be supplied as an image with Web page 510. In the depicted examples, the graphical object provides cursor, also referred to as a pointer, which is controlled by a pointing device, such as a mouse. The instructions may take different forms depending on the implementation. For example, the instructions may be HTML statements or JavaScript. Web page 510 is received by browser 502 and is displayed within client 500. In response to the display, the instructions are executed to selectively replace the pointer in client 500 with the pointer specified by a cascading style sheet (CSS) cursor statement. Cascading Style Sheets, level 2 (CSS2) is a style sheet language that allows authors and users to attach style (e.g., fonts, spacing, and aural cues) to structured documents (e.g., HTML documents and XML applications). By separating the presentation style of documents from the content of documents, CSS2 simplifies Web authoring and site maintenance. When the instructions are executed, the CSS2 cursor will be retrieved and displayed. Additionally, depending on the implementation, more than one user defined cursor may be retrieved for use in presenting the pointer. This new pointer is also referred to as an advertising pointer, which is an image associated with an organization.

The replacement of the pointer with the advertising pointer may occur, for example, when the pointer is located over the screen displayed by browser 502 in client 500. Alternatively, the advertising pointer may be displayed at all times while the page is displayed. In addition, either several user defined pointers may be used or the graphical object may contain several images such that the graphical image used to present the pointer within client 500 changes in response to an event. This event may occur on a periodic basis or may be in the form of a selected user input. For example, the user input used to trigger the change in the presentation of the pointer may be the movement of the pointer over a selected portion of the displayed Web page. In this manner, the advertising pointer may be used as an advertising or brand awareness medium for an organization. The organization may use its logo or trademark in the pointer or in place of the pointer.

In addition, web server 508 adds "format for print" (FFP) button 514 to web page 510. In response to receiving a selection of FFP button 514, a determination is made if a print format plugin (not shown) is on client 500. If the print format plugin is not on client 500, then the print format plugin is downloaded to client 500.

Once on client 500, the print format plugin may query content of Web page 510 and advertising content of Web page 510 from one of several locations. This Web page content and advertising content of Web page 510 may have already been downloaded to client 500 from, for example, server 508 and/or queried as to its existence from, for example, server 508 or any other server connected to client 500. The advertising content may be any advertising media downloaded to client 500, such as, for example, a banner, a static advertisement, a advertising cursor, and the like. Furthermore, the advertising content may be a completely different advertisement relative to the print medium process, such as, for example, printing ink toner advertisements, printing ink cartridge advertisements, and the like. The print format plugin may be located on a server and may be a piece of code which the browser uses to format a page for printing and then sends the formatted page to a printer. The print format plugin now may render a printable image configuring both the Web page content and the advertising content. A printable image configuration may be, for example, a watermark, a banner placement, printing on separate pages, and the like. A banner placement may be located anywhere on a printable area.

Figure 6A:
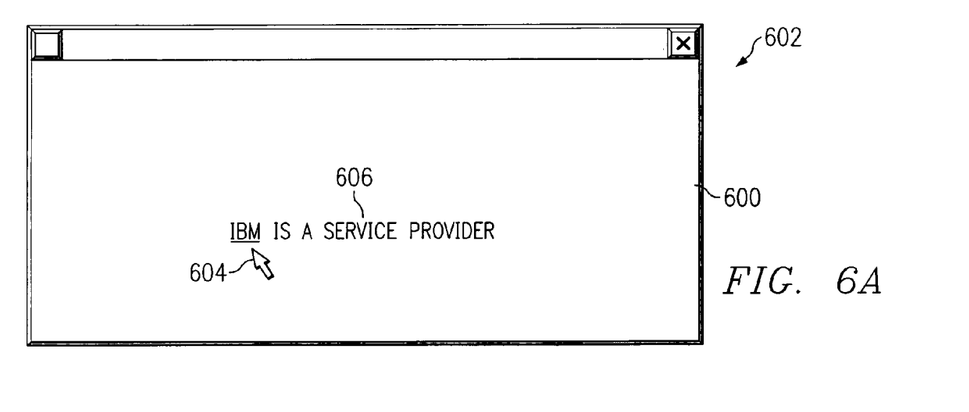
FIGS. 6A–6C depict diagrams illustrating the replacement of a disjoint web object in accordance with a preferred embodiment of the present invention.
Figure 6B:
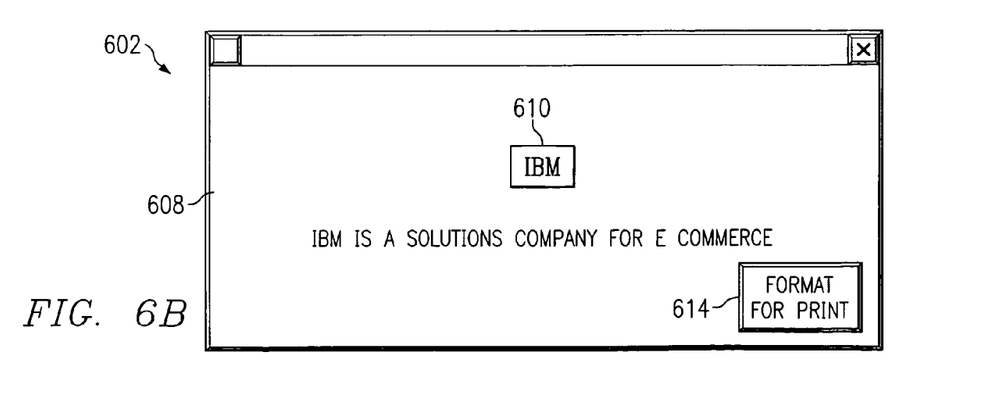
Figure 6C:
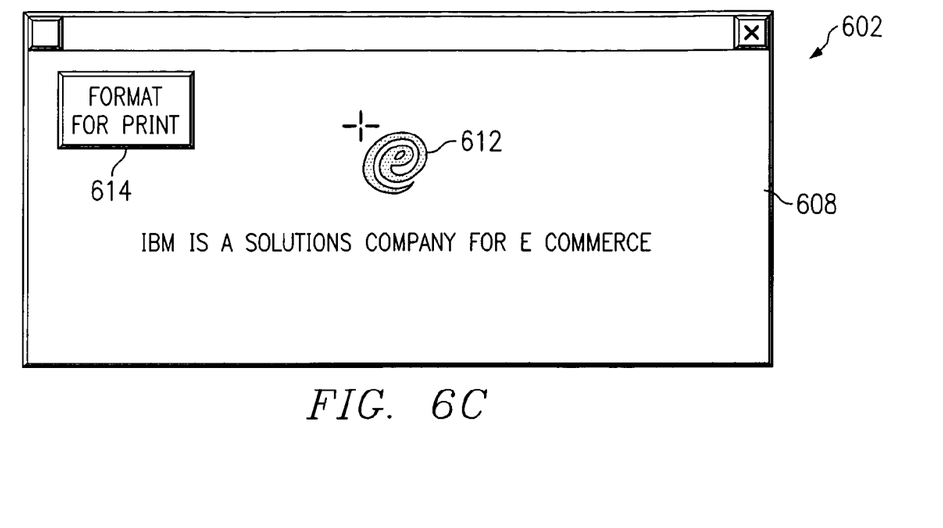

FIGS. 6A–6C depict diagrams illustrating the replacement of a disjoint web object in accordance with a preferred embodiment of the present invention. In FIG. 6A, a document 600 is displayed within browser 602. Browser 602 may be implemented with a browser, such as browser 400 in FIG. 4. In this example, a user manipulating pointer 604 using a pointing device may select a document or resource by selecting a link 606. In response, a request to select a server and another document, such as web page 608 in FIG. 6B is returned. Web page 608 is displayed within browser 602. Additionally, Web page 608 includes CSS2 cursor statement (not shown), which causes a replacement of pointer 604 with pointer 610. In accordance with a preferred embodiment of the present invention, the replacement of the normal pointer with a new pointer is used to turn the pointer into an advertising medium for an organization. Organizations, such as, for example, computer companies, banks, and political groups may use the pointer as a medium to gain awareness with users on the Internet. In this example, pointer 610 is an IBM logo for International Business Machines Corporation. In this particular case, the logo is a registered trademark and is used to replace pointer 604.

When the web page is downloaded from the server, the browser adds "format for print" button 614. In response to a selection of "format for print" button 614, a print format plugin may be downloaded from a server to a client. In response to the arrival of the print format plugin, the print format plugin may query Web page content and advertising content associated with pointer 610, for example. After querying the Web page content and the advertising content, the print format plugin may render a printable page, laying out both the Web page content and the advertising content.

In FIG. 6C, an example of another logo used for e-commerce is illustrated by pointer 612 in FIG. 6C. Pointer 612 replaces the normal pointer in this example. A pointer, for example, pointer 612 is a significant piece of real estate for marketing and advertising because the user may often shift focus away from different types of screen advertising or marketing mechanisms. On the other hand, with a pointer, the user is almost always, unless navigating by keyboard or speech, interacting using the pointer. Additional effectiveness in using pointer 612 is the ability to print a page so pointer 612 is displayed upon the printed page. With pointer 612 displayed upon the printed page, maximum impact of a trademark or logo is experienced. Not only is pointer 612 displayed in a temporary fashion upon a web page, pointer 612 is printed so as to provide a permanent record of the display of the trademark or logo.

Figure 7A:
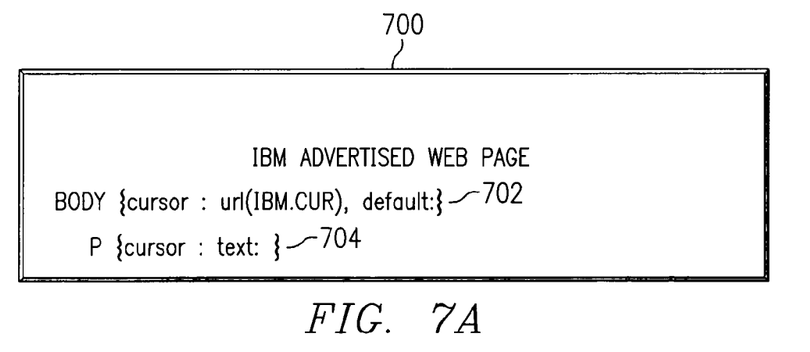
FIGS. 7A and 7B depict diagrams illustrating content in a Web page in accordance with a preferred embodiment of the present invention.
Figure 7B:
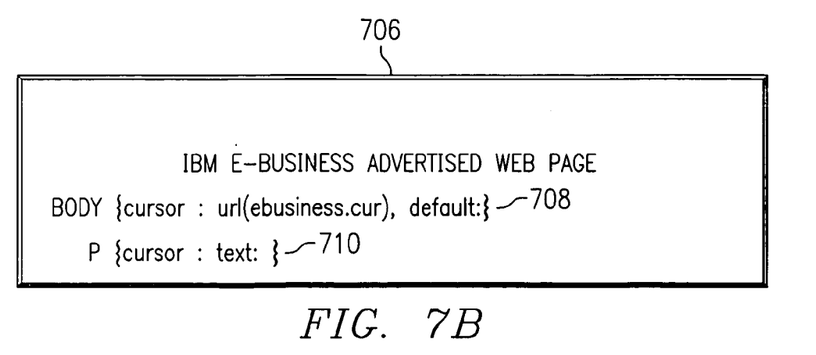

FIGS. 7A and 7B depict diagrams illustrating content in a Web page in accordance with a preferred embodiment of the present invention. In FIG. 7A, Web page 700 includes statement 702 and statement 704. These statements are used to turn the pointer into an appropriate advertisement pointer as illustrated in FIGS. 6A–6C. Statement 702 is a HTML body statement used to replace the current pointer with the pointer embedded or associated with Web page 700 when the pointer is over the body of the Web page. In this example, pointer 610 in FIG. 6B is displayed when the pointer is over Web page 700. Statement 704 is a HTML paragraph statement, which turns the pointer back into a text I-Bar form when the pointer is over a text in the Web page.

In FIG. 7B, Web page 706 contains statements 708 and 710, which perform the same function as statements 702 and 704 as above. In this example, statement 708 causes pointer 612 in FIG. 6C to be displayed when the pointer is over Web page 706.

In the depicted examples, the statements are in HTML. Of course, other statements may be used to manipulate the cursor, such as Javascript statements for notification of pointer movement and placing HTML images at or around the pointer's current position. The pointer file is supplied as a local image or URL. With the pointer being specified in the HTML document, the pointer will be supplied and rendered as any element in the document. This example is for a static Web page. Dynamic Web page support also may be provided by embedding random or predetermined combinations of pointers.

Figure 8:
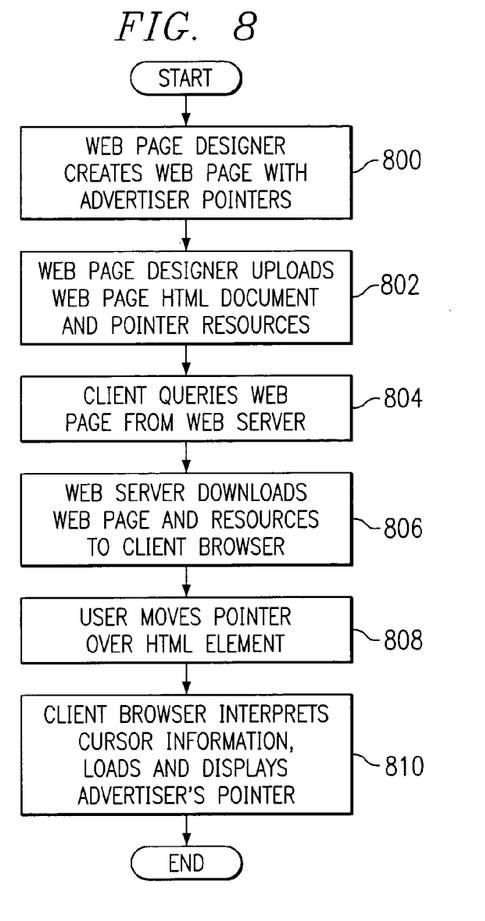
FIG. 8 is a flowchart of a process for creating and displaying an advertising disjoint web object in accordance with a preferred embodiment of the present invention.

FIG. 8 is a flowchart of a process for creating and displaying an advertising pointer disjoint web object in accordance with a preferred embodiment of the present invention. In this example, the operation starts with a creation of a Web page including one or more advertiser pointers (step 800). Thereafter, the Web page is uploaded along with the pointer resources needed to display an advertising pointer (step 802). A client queries a Web server for the Web page using a browser (step 804). The Web server downloads the Web page and pointer resources to the browser at the client (step 806). Thereafter, the user moves the pointer over an HTML element (step 808). In response to the movement of the pointer over an HTML element, the browser interprets the cursor information, loads, and displays the advertiser pointer or pointers (step 810) over each defined HTML element and thereafter the operation terminates.

Figure 9:
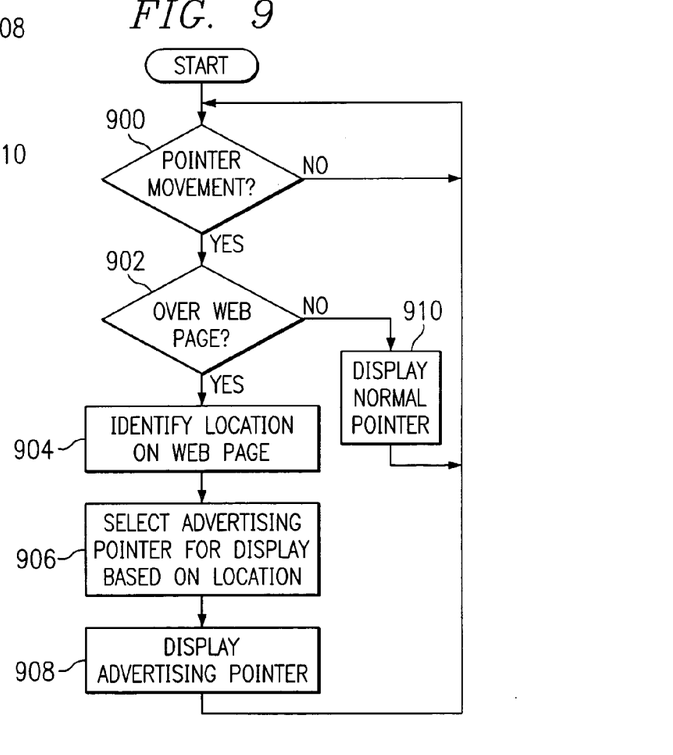
FIG. 9 is a flowchart of a process for displaying an advertising disjoint web object in a web page in accordance with a preferred embodiment of the present invention.

FIG. 9 is a flowchart of a process for displaying an advertising disjoint web object in a web page in accordance with a preferred embodiment of the present invention. These processes may be implemented using JavaScript or other instructions.

In this example, the operation starts with a determination as to whether or not a movement of the pointer has occurred (step 900). If a movement of the pointer has not occurred (step 900:NO), the process repeats step 900 in which a determination is made as to whether or not a movement of the pointer has occurred. If a movement of the pointer has occurred (step 900:YES), a determination is made as to whether or not the pointer is located over the Web page (step 902). If the pointer is not located over the Web page (step 902:NO), the pointer is displayed in a normal manner (step 910), and thereafter the operation returns to step 900 in which a determination is made as to whether or not a movement of the pointer has occurred. If the pointer is located over the Web page (step 902:YES), then the location of the pointer on the Web page is identified (step 904).

An advertising pointer is then selected for display based on the location of the pointer (step 906). Depending on the location of the pointer, the selection may be that an advertising pointer will not be used. Further, different advertising pointers may be selected depending on the location. For example, if the advertising pointer is located over text, an image, or a URL for a specific company, such as, for example, a computer company, a music company, and the like, the advertising pointer for the company may be selected for display. The selected advertising pointer is displayed (step 908) with the process returning to step 900 in which a determination is made as to whether or not movement of the pointer has occurred.

Figure 10:
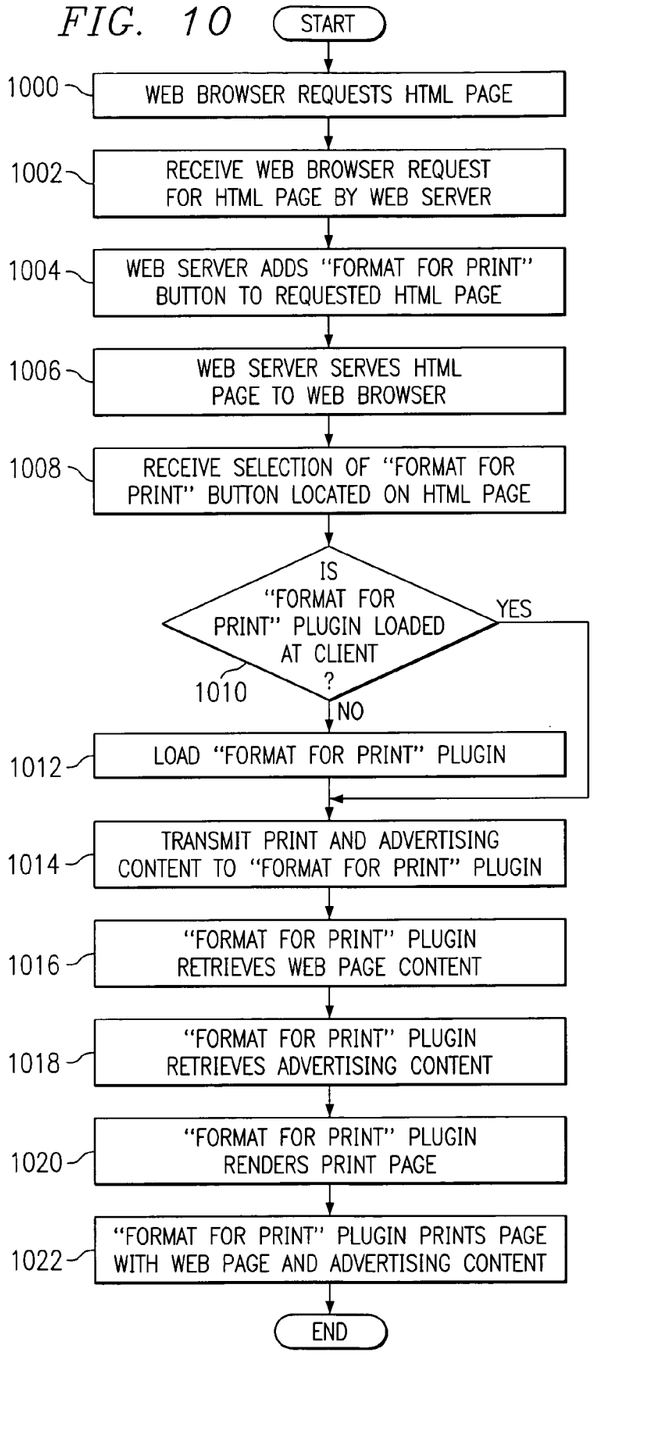
FIG. 10 is a flowchart of a process for printing a display of an advertising disjoint web object in a web page in accordance with a preferred embodiment of the present invention.

FIG. 10 is a flowchart of a process for printing a display of an advertising pointer disjoint web object in a web page in accordance with a preferred embodiment of the present invention. In this example, the operation starts by a web browser requesting a HTML page (step 1000). The web server then receives the request for the HTML page by the web browser (step 1002). The web server then adds a "format for print" button to the requested HTML page (step 1004). The web server then serves the HTML page to the web browser (step 1006). A selection of the "format for print" button located on the HTML page is received (step 1008). Then a determination is made as to whether or not a "format for print" plugin is loaded at a client (step 1010). If the "format for print" plugin is not loaded at the client (step 1010:NO), then the "format for print" plugin is loaded into the client (step 1012). Whether the "format for print" is already loaded at the client (step 1010:YES) or the "format for print" plugin is loaded at the client (step 1012), Web page content and advertising content is the transmitted to the "format for print" plugin (step 1014).

The "format for print" plugin retrieves the Web page content (step 1016). The "format for print" plugin then retrieves the advertising content (step 1018). The "format for print" plugin renders a print page (step 1020). The "format for print" plugin then prints the rendered print page with the advertising disjoint web object and web page text (step 1022), and thereafter the operation terminates.

Thus, the present invention provides a method, system, and computer program product for printing additional advertising or brand awareness space from a Web page. The present invention provides an advantage by using an embedded tag as a disjoint web object as an additional advertising medium and prints this disjoint web object along with content of the Web page. A printed page containing both the disjoint web object content and the text of the web page is produced thereby providing a permanent display of both the content of the disjoint web object and the text of the web page so as to provide maximum effectiveness of the advertising.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples illustrate the use of JavaScript embedded within the web page as the mechanism for altering the presentation of the pointer, other mechanisms may be used. A Java Applet is another mechanism which may be used to change the presentation of the pointer. The type of advertising may be for any product or message in addition to a company logo. In other words, the advertising space provided by the pointer may be used for any sort of awareness or recognition of an organization. In addition, even though the embodiment illustrated in the above description uses a button attached to a web page, for example, the "format for print" button, alternative methods of sending a print command may be used within the spirit and scope of the present invention. For example, a browser print button may be overridden and a print request using alternate means may be provided or by using a drag and drop procedure.

In the depicted examples, no changes to a browser are needed to view the graphical object. Of course, other implementations may be used to provide a graphical object for replacing a pointer to advertise or provide awareness for a business.

Further, the use of the processes of the present invention may be applied to any medium using a pointing device. For example, the present invention may be implemented in a set top box for a television or in an ATM machine or any device capable of accessing data. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for printing a content of a web page, comprising the steps of:
   receiving the content of the web page, wherein the content comprises an embedded tag and instructions for changing an appearance of a disjoint web object presented on a display of the data processing system;
   presenting the web page on the display;
   responsive to presenting the web page, presenting the embedded tag as the disjoint web object using the received instructions when the disjoint web object is located in areas of the display over the web page while the web page is being presented, wherein the embedded tag is not presented as the disjoint web object in response to a movement of the disjoint web object off the web page; and
   enabling a printing of the disjoint web object based on the embedded tag, wherein content relative to the disjoint web object is enabled to be printed along with the content of the web page.

2. The method as recited in claim 1, wherein the step of printing the disjoint web object based on the embedded tag, further comprises:
   inserting a print command in the web page; and
   printing content relative to the disjoint web object along with content of the web page utilizing the print command in the web page.

3. The method as recited in claim 2, wherein the print command is a button located in the web page.

4. The method as recited in claim 1, further comprising:
   responsive to a determination that a "format for print" plugin is not installed, downloading the "format for print" plugin.

5. The method as recited in claim 4, further comprising:
   printing the page based on the disjoint web object and the content of the web page.

6. The method as recited in claim 1, wherein a "format for print" plugin can override printing the disjoint web object based on the embedded tag.

7. The method as recited in claim 1, wherein the disjoint web object is at least one of a pointer, content in a web frame, and content in a web window.

8. A method in a data processing system for printing a content of a web page, comprising the steps of:
   receiving the content of the web page, wherein the content comprises an embedded tag and instructions for changing an appearance of a disjoint web object presented on a display of the data processing system;
   presenting the web page on the display;
   responsive to presenting the web page, presenting the embedded tag as the disjoint web object using the received instructions; and
   enabling a printing of the disjoint web object based on the embedded tag, wherein content relative to the disjoint web object is enabled to be printed along with the content of the web page, wherein the embedded tag is a first embedded tag and further comprising:
   embedding a second tag as the disjoint web object in the web page; and
   responsive to an event, presenting the second embedded tag as the disjoint web object, wherein the event is a selected user input and wherein the selected user input is a movement of the disjoint web object over a selected portion of the web page.

9. A method for printing a content of a document in a data processing system, comprising the steps of:
   receiving the document from a source on the data processing system, wherein the document includes a graphical object, wherein the graphical object is associated with an organization;
   responsive to displaying the document in the data processing system, presenting the graphical object as a disjoint web object using the graphical object, wherein the disjoint web object is a pointer for a pointing device, and the graphical object is presented as the pointer for the pointing device in lieu of presenting a normal pointer for the pointing device; and
   printing the disjoint web object based on the graphical object, wherein the disjoint web object is printed along with the content of the document.

10. The method as recited in claim 9, wherein the step of presenting comprises:
    presenting the graphical object as the pointer for the pointing device when the disjoint web object is over the document and presenting the normal pointer as the pointer for the pointing device when the disjoint web object is not over the document.

11. The method as recited in claim 9, wherein the document is a web page.

12. The method as recited in claim 9, wherein the graphical object comprises a set of tags and wherein the step of presenting the disjoint web object using the graphical object comprises:
    presenting a tag from the set of tags as the disjoint web object in response to an event.

13. The method as recited in claim 12, wherein the event is a periodic event.

14. The method as recited in claim 12, wherein the event is a selected user input.

15. The method as recited in claim 14, wherein the selected user input is a movement of the disjoint web object over a portion of the document.

16. The method as recited in claim 12, wherein the presenting step presents a tag from the set of tags in a selected order.

17. The method as recited in claim 12, wherein the presenting step presents a tag from the set of tags in a random order.

18. The method as recited in claim 9, wherein the graphical object is a logo for a company.

19. A data processing system, comprising:
    a network;
    a server functionally connected to the network, wherein the server stores a document including an embedded tag for changing appearance of a pointing device cursor, wherein the server sends the document in response to a request for the document; and
    a plurality of clients functionally connected to the network, wherein a client within the plurality of clients includes a graphical user interface and a disjoint web object, the client receives the document from the server in response to requesting the document, the client displays the document, the client displays the embedded tag as the disjoint web object in lieu of displaying a normal pointing device cursor as the disjoint web object, and the disjoint web object is printed based on the embedded tag, wherein content relative to the disjoint web object is enabled to be printed along with content of the web page.

20. The data processing system as recited in claim 19, wherein the embedded tag is displayed as the disjoint web object when the disjoint web object is located in an area of the display over the web page while the web page is being presented.

21. The data processing system as recited in claim 19, wherein the document is displayed within a browser.

22. A data processing system, comprising:

means for receiving content of a web page, wherein the content comprises a disjoint web object and instructions for changing an appearance of a disjoint web object presented on a display of the data processing system;

means for presenting the web page on the display;

presenting means, responsive to presenting the web page, for presenting an embedded tag as the disjoint web object using the received instructions when the disjoint web object is located in areas of the display over the web page while the web page is being presented, wherein the embedded tag is not presented as the disjoint web object in response to a movement of the disjoint web object off the web page; and printing means for printing the disjoint web object based on the embedded tag, wherein content relative to the disjoint web object is enabled to be printed along with the content of the web page.

23. The data processing system as recited in claim 22, further comprising:

presenting means for presenting the embedded tag as the disjoint web object when the disjoint web object is located in areas of the display over the web page while the web page is being presented.

24. The data processing system as recited in claim 22, wherein the embedded tag is a first embedded tag and further comprising:

embedding means for embedding a second tag as the disjoint web object in the web page; and presenting means, responsive to an event, for presenting the second embedded tag as the disjoint web object.

25. The data processing system as recited in claim 22, wherein the printing means for printing the disjoint web object based on the embedded tag further comprises:

inserting means for inserting a print command in the web page; and printing means for printing content relative to the disjoint web object along with content of the web page.

26. The data processing system as recited in claim 22, further comprising:

downloading means, responsive to a determination that a "format for print" plugin is not installed, for downloading the "format for print" plugin.

27. A data processing system for printing a content of a document, comprising:

receiving means for receiving the content of the document, wherein the content comprises a graphical object and instructions for changing an appearance of a disjoint web object presented on a display of the data processing system;

means for displaying the document on the display;

presenting means, responsive to displaying the document, for presenting the graphical object as the disjoint web object using the graphical object when the disjoint web object is located in areas of the display over the document while the document is being presented, wherein the graphical object is not presented as the disjoint web object in response to a movement of the disjoint web object off the document; and printing means for printing the disjoint web object based on the graphical object, wherein the disjoint web object is enabled to be printed along with content of the document.

28. The data processing system as recited in claim 27, wherein the graphical object comprises a set of tags and wherein the step of presenting the disjoint web object using the graphical object comprises:

presenting means for presenting a tag from the set of tags as the disjoint web object in response to an event.

29. A data processing system for printing a content of a document, comprising:

receiving means for receiving the content of the document, wherein the content comprises a graphical object and instructions for changing an appearance of a disjoint web object presented on a display of the data processing system;

means for displaying the document on the display;

presenting means, responsive to displaying the document, for presenting the graphical object as the disjoint web object using the graphical object, wherein the presenting means comprises presenting means for presenting the graphical object as a pointer for a pointing device when the disjoint web object is over the document and presenting a normal pointer as the pointer for the pointing device when the disjoint web object is not over the document; and printing means for printing the disjoint web object based on the graphical object, wherein the disjoint web object is enabled to be printed along with content of the document.

30. A computer-readable medium storing a computer program product for use in a data processing system for printing a disjoint web object and content of a web page, comprising the steps of:

instructions for receiving the content of the web page, wherein the content comprises an embedded tag and instructions for changing an appearance of a disjoint web object presented on a display of the data processing system;

instructions for presenting the web page on the display;

instructions, responsive to presenting the web page, for presenting the embedded tag as the disjoint web object using the received instructions when the disjoint web object is located in areas of the display over the web page while the web page is being presented, wherein the embedded tag is not presented as the disjoint web object in response to a movement of the disjoint web object off the web page; and instructions for printing the disjoint web object based on the embedded tag, wherein content relative to the disjoint web object is enabled to be printed along with the content of the web page.

31. A computer-readable medium storing a computer program product for use in a data processing system for printing a disjoint web object and content of a document, comprising:
  instructions for receiving the document from a source on a data processing system, wherein the document includes a graphical object, wherein the graphical object is associated with an organization;
  instructions, responsive to displaying the document in the data processing system, for presenting the graphical object as the disjoint web object using the graphical object, wherein the disjoint web object is a pointer for a pointing device, and the graphical object is presented as the pointer for the pointing device in lieu of presenting a normal pointer for the pointing device; and
  instructions for printing the disjoint web object based on the graphical object, wherein the disjoint web object is enabled to be printed along with the content of the document.

* * * * *